Aug. 28, 1928.                    R. B. CLARK                    1,682,553
                           FILM WINDING MECHANISM
                 Filed Aug. 30, 1926            2 Sheets-Sheet 1
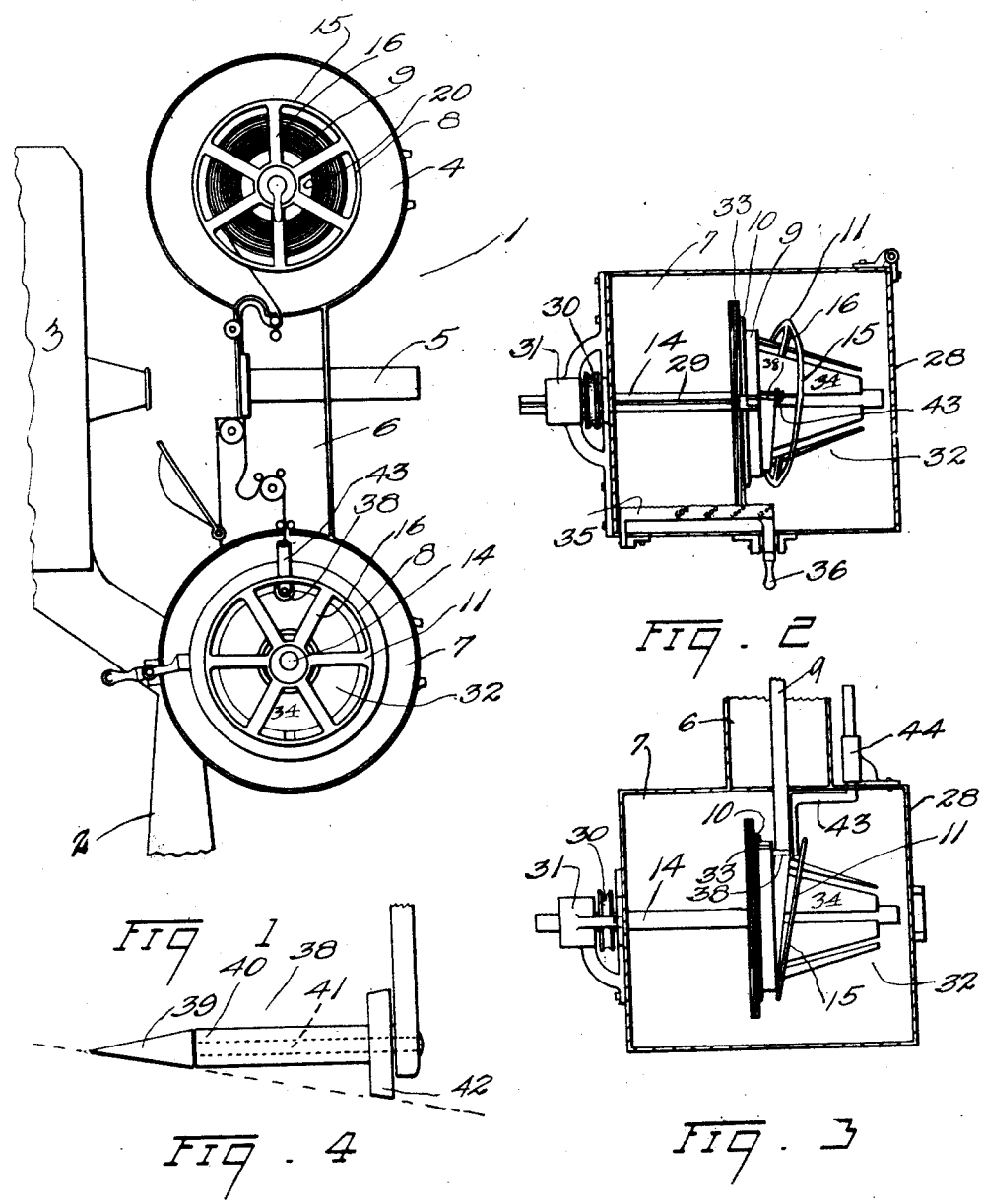
INVENTOR
Raymond B. Clark
BY
ATTORNEY

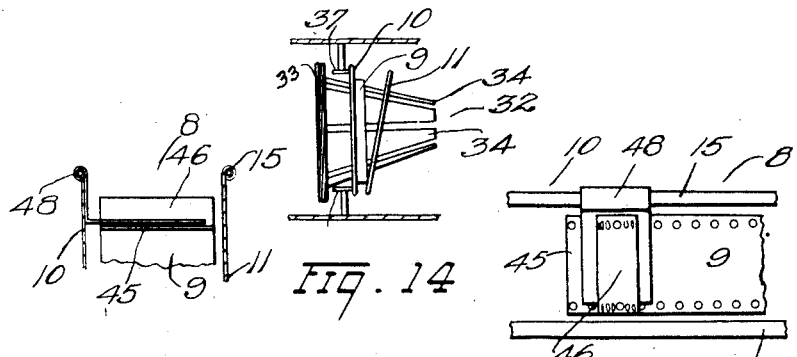
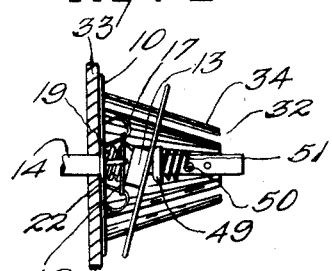
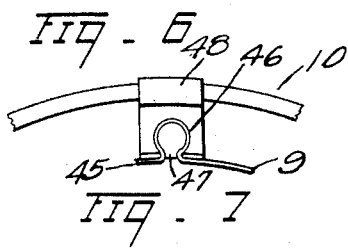
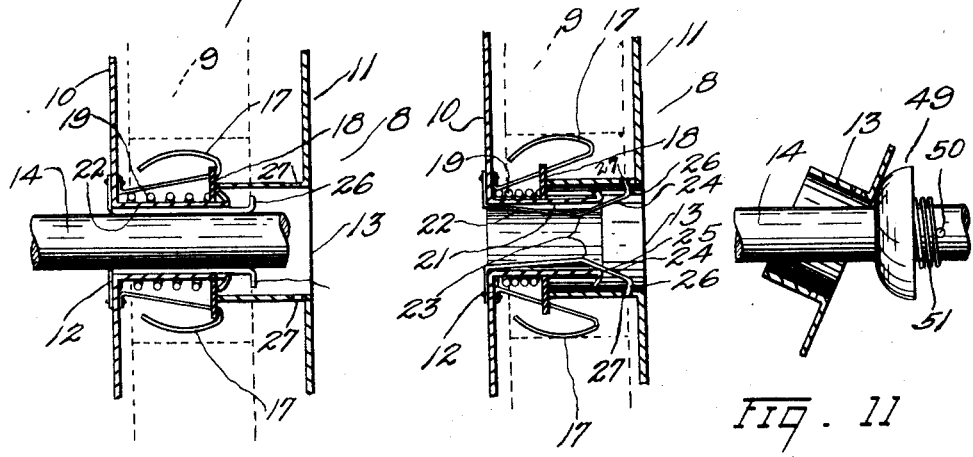
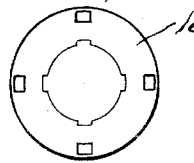
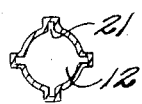

Patented Aug. 28, 1928.

1,682,553

UNITED STATES PATENT OFFICE.

RAYMOND B. CLARK, OF FREEWATER, OREGON.

FILM-WINDING MECHANISM.

Application filed August 30, 1926. Serial No. 132,390.

This invention relates to a film winding mechanism and has as one of its objects to provide a mechanism that is operable in conjunction with moving picture machines.

Another object of this invention is to provide a mechanism for winding a film directly upon its passage through a moving picture machine in a manner that the film will be ready for use without the necessity for rewinding.

A further object of the invention is to provide a mechanism that will wind a film on a reel in a manner that the front end of the film will be available for subsequent use without the necessity of rewinding.

A further object of the invention is to provide a film winding mechanism that will wind a film on a reel by forming its outer perimeter first and directing the successive convolutions toward the center.

A further object of the invention is to provide a film winding mechanism that will wind a film on a reel from the outside in and arranging means on the reel to maintain the last convolutions of the film securely against the adjacent convolutions.

With these and other objects in view reference is now had to the accompanying drawings in which Fig. 1 is a side elevation of a fragment of a moving picture machine showing the course of the film therethrough and the reel winding mechanism;

Fig. 2 is a plan view of the film winding mechanism shown in its relation to the housing therefor;

Fig. 3 is a side elevation of the film winding mechanism;

Fig. 4 is an enlarged view of a roller forming part of the device;

Fig. 5 is an edge view of a clip for holding the front end of the film;

Fig. 6 is a plan view thereof;

Fig. 7 is a front elevation thereof;

Fig. 8 is a sectional elevation of a cone showing the internal arrangement;

Fig. 9 is an enlarged sectional view of the hub of the reel in its assembled position;

Fig. 10 is a similar view to Fig. 9 in a partly disassembled position;

Fig. 11 is an enlarged view of a fragment of the shaft and one portion of the reel hub showing the tension member as applied thereto;

Fig. 12 is a front elevation of the spring expanding plate;

Fig. 13 is a cross section of a part of the reel hub; and

Fig. 14 is a side elevation of the cone showing means to maintain the reel in a fixed position.

Having reference to the drawings like numerals refer to like parts throughout the several views and the numeral 1 refers to a moving picture machine consisting of a support 2, a lantern house 3, mounted on the support, an upper reel house 4, a projector tube 5, mounted in a projector housing 6 and a lower reel housing 7 suitably connected to the projector house.

Mounted in the upper housing 4 is a reel 8 upon which a film 9 is wound, the film passing through the projector housing 6 in the usual manner and continuing through to the lower reel housing 7 there to be wound upon a second reel 8, which with its winding mechanism, contained in said housing, forms the subject matter of this invention.

Both reels mentioned are identical in construction showing the adaptability of the reel to the winding or unwinding of the film.

The reel 8 comprises two separable major parts, said parts being considered for convenience as a base part 10 and a cap part 11. Each of these parts has its own respective hub 12 and 13 respectively, the hub 12 of the base part having a smaller diameter than that of the cap part to provide for slidable engagement with that member, and for engagement with a shaft 14 which will be subsequently mentioned.

The reel is rotatable with and removably supported by said shaft 14, and the parts during operation are adapted to assume diverging planes for co-operative action in rewinding the film.

Each part of the reel has the usual rim 15, with substantial spokes 16 joining the rim to the hub, and these spokes are arranged to be utilized to rotate the reel parts on a winding mechanism which will be presently explained.

Mounted on the base hub 12 are expanding tension arms 17, and these arms are secured in and operate by means of a plate 18 which is slidably mounted on said base hub, a yielding means 19 being provided between the plate and the spokes 16 of the reel to press said plate outward, which movement of the plate will retract the tension arms, while the reverse movement of said plate, operable by means of the hub 13 of the cap part, will expand said tension arms outward to engage the innermost convolution 20 of the completely wound film 9.

The base hub 12 is formed with recesses 21 and seated in these recesses are locking arms 22 that are secured to the hub 12 by a rivet or other suitable means, and these locking arms are normally bent, at the point 23, and continue with an extension piece 24 that normally bears against the outer edge 25 of the base hub, the latter edge forming a fulcrum by which an outturned end 26 of said arm may be caused to expand or contract by the insertion of said shaft 14 in the base hub, this action pressing against the bent part of said arm forcing it outward and into said recesses 21 thus moving the extended part of the arm upon said fulcrum to retract the bent ends.

The cap hub 13 is provided with orifices 27 to receive these outturned ends 26 and hence when the cap part 11 is assembled on the base part 10 the cap hub 13 will press downward against the plate 18, before the base part is removed from said winding mechanism, when both parts are then withdrawn from said shaft which movement will release and permit the outturned end 26 of the arm to engage the orifices and thereby lock the two parts securely together.

The above mentioned shaft 14 is extended forward well toward the front 18 of the lower reel housing 7 and is provided with a key seat 29 to accommodate a feather key (not shown) attached to the pulley 30 slidably mounted on the shaft, in the usual manner of such assembly, to provide for a longitudinal movement of the shaft in the journal 31 in connection with its rotating movement, the journal being of such structure that it will amply support the shaft and the operating mechanism mounted on the shaft and which will be explained.

On this shaft is securely mounted a form 32 having a general cone shape, and this cone shaped form is provided with a substantial threaded head 33 whereby the cone may be secured to the shaft. The cone is furcated to form prongs 34, each prong being insertable between the spokes 16 of the reel with the slots between the prongs loosely engaging said spokes.

As the successful winding operation of the cone depends upon decreasing the diameter thereof as the successive convolutions of the film are wound thereon, and as the position of the reel is fixed and governed by the position of the film in its passage through the projector and housing, it obviously will be necessary to provide a form arranged to present an ever decreasing diameter to the film. This may be accomplished by retracting the prongs toward the shaft but is preferably accomplished by moving the cone in a longitudinal path with the shaft, (which latter is my preferred form) and hence the first mentioned method is not shown.

To accomplish this longitudinal movement the head 33 of the cone is threaded, as above mentioned, and a graduated block 35, having threads engageable with the threads of said head, is hingedly attached to the housing in a manner that the block may be disengaged by depressing a handle 36 so that the cone may be moved forward manually preparatory to winding the film.

It is now obvious that rotating the shaft, and the cone, by means of the pulley, and with the threaded head engaging the block, that a gradual receding movement of the cone will obtain, and with means to maintain the base part of the reel, which is mounted on the shaft and in the cone, in a fixed position, such means being represented by small wheels 37 as shown in Fig. 14, it is obvious that an ever decreasing diameter will be presented at the point of film reception, and that this decreasing diameter of the form will provide a way to insert the last convolution under the preceding convolution of the film.

To maintain the base part of the reel perpendicular to the shaft the hub 12 thereof is designed to fit the shaft, and in operation is slidably mounted thereon with the spokes 16 positioned between the prongs. As it is necessary to place the reel on the shaft before the two parts can be separated this is now done and upon the shaft unlocking the locking arm the base part is pressed back upon the shaft until it contacts the small wheels 37, and the cap part with its enlarged hub, which enables it to take a position at an angle to the horizontal is now also moved backward.

Now a roller 38 is provided at the point of film reception, and this roller consists of a rotatable point 39 insertable beneath the wound part of the film, with a second roller 40 mounted on the same shaft 41 in a manner to be free to rotate in the opposite direction to the first mentioned roller, and this roller 38 is provided with a friction wheel 42 that normally engages the cone and forms a guide for the oncoming film.

The roller 38 is supported by an arm 43 that is slidably mounted in a rectangular sleeve 44 secured conveniently to maintain the vertical alignment of the roller, and the roller is maintained in contact with the cone by the weight of the arm, the weight being sufficient also to hold the film directly against the cone at the point of film reception.

The roller 38 may be of the form shown or may have a constant taper throughout its length if desired.

In starting the winding operation the end 45 of the film is doubled as at 46, and slipped into a slot 47 on a catch 48 that is secured to the rim 15 of the base portion of the reel, the cone is then rotated one revolution when the point 39 of the roller 38 will be inserted beneath this convolution, and the oncoming part of the film is then brought beneath the second part 40 of the roller.

It will now be noted by reference to Fig. 3 that the cap part 11 of the reel is spread from the base part, and maintained there, on the upper side of the cone, by means of the arm 43 carrying the roller 38, and that the lower part of the cap part of the reel rests against the wound convolution of the film. This position of the cap part of the reel is accomplished and maintained by a tension member 49 removably mounted on the shaft 14, the tension member comprising a semi-spherical button, a pin 50, and a spring 51, positioned between the button and the pin. By this means the upper parts of the reel are spread apart to receive the film and at another point, preferably diametrally opposite to the point of film reception, the parts are maintained against the film, and the purpose of this will now be explained in describing the operation of the device.

In operation the film is threaded through the different rollers and parts of the projector and its end 45 is fastened in the catch 48 and one revolution of the cone is then made and the roller brought down with its point inserted beneath the first convolution and now formed over the oncoming film. The block 35 is then manipulated into engagement with the threaded head when the machine is ready for operation.

As the mechanism is started to throw the picture upon the screen the cone begins its rotating movement and simultaneously its receding movement, the film is carried around the cone and the lower part of the cap part of the reel now presses the film at that point beneath the preceding convolution and this operation continues until the completion of the picture.

Upon the completion of the picture the arm and roller 38 is raised which leaves the cap part of the reel free to move on the shaft against the film at its upper side when the tension member is removed and the reel withdrawn from the shaft, this movement locking the two parts of the reel together as above mentioned, and as the reel is withdrawn from the cone the expending tension arms 17 engage the inner convolution of the wound film securing it in place.

It will be noted by reference to Fig. 2 that the block contains certain numerals which numerals may be arbitrary or may be used to designate a certain number of feet in the film, and use is made of these graduations in and for the following manner and purpose;

Suppose a film of 1200 feet is to be wound, the threaded head is moved to a position corresponding to the 1200 mark on the block, then when the film is wound the last convolution will have a certain diametral dimension. Then suppose that the film was 500 feet in length, by placing the threaded head in contact with the block at this point thereon, the inner diameter of the completed coil will be identical with that of the 1200 foot film. By this means then the expanding tension arms will always contact the inner convolution with equal tension, the tension of the outer convolution being maintained normally with its end secured in the manner above mentioned.

By this means the length of film is immaterial and in winding requires no attention outside of arranging the block and the head at the proper mark.

While the device has been described as a means to wind films it is obvious that other long lengths of material may be wound without departing from the spirit of my invention.

Having thus described my invention, I claim—

1. In a film winding mechanism, a shaft, a reel rotatable with and removably supported by said shaft, and comprising two separable major parts, a base part and a cap part, said parts being co-operable and adapted to assume diverging planes during operation, each of said parts having its own respective hub, said hubs being arranged for slidable and lockable engagement, and means mounted on and rotatable with said shaft, and carrying said reel to form convolutions of the film of decreased diameter and to insert the last convolution under the preceding convolution of the film.

2. In a film winding mechanism, a shaft, a reel rotatable with and removably supported by said shaft, and comprising two separable major parts, a base part and a cap part, said parts being co-operable and adapted to assume diverging planes during operation, each of said parts having its own respective hub, said hubs being arranged for slidable and lockable engagement, a form mounted on and rotatable with said shaft, and carrying said reel and arranged to decrease its diameter as the successive convolutions of the film are formed, and means to insert the forming convolution beneath the last formed convolution of the film.

3. In a film winding mechanism, a shaft, a reel rotatable with and removably supported by said shaft, and comprising two separable major parts, a base part and a cap part, said parts being co-operable and adapted to assume diverging planes during operation, each of said parts having its own respective hub, said hubs being arranged for slidable and lockable engagement, a form mounted on and rotatable with said shaft, and having decreasing diameters, means to insert the forming convolution of the film beneath the preceding convolution, means to recede the form as the successive convolutions of ever decreasing diameter are formed, means to insert the last convolution under the preceding convolution of the film as the form recedes, and means to guide the film onto the form.

4. In a film winding mechanism, a shaft, a reel rotatable with and removably supported by said shaft, and comprising two separable major parts, a base part and a cap part, said parts being co-operable and adapted to assume diverging planes during operation, each of said parts having its own respective hub, the hub of the base part having a smaller diameter than that of the cap part, and said hubs being arranged for slidable and lockable engagement, a shaft rotatably mounted in a supporting journal and designed to receive said base hub, a form mounted on and rotatable with said shaft, and mounted on said shaft and provided with reducible prongs to support and rotate said reel, means to recede the prongs as the successive convolutions of ever decreasing diameter are formed, to harmonize with said diameters, means to insert the last convolution under the preceding convolution as the form recedes, and means to guide the film onto the form.

5. In a film winding mechanism, a reel comprising two separable major parts, a base part and a cap part, each of said parts having its own respective hub, and arranged to engage the opposite hub, a shaft mounted in a journal and arranged for rotatable and longitudinal movement therein, a cone secured to said shaft and arranged to receive said reel, means to spread apart the parts of the reel at the point of film reception, and means to close said parts against the film at another point.

6. In a film winding mechanism, a reel comprising two separable major parts, a base part and a cap part, each of said parts having its own respective hub, the hub of the base part having a smaller diameter than that of the cap part, said hubs being arranged for slidable engagement, a shaft mounted in a journal and arranged for rotatable and longitudinal movement therein, a cone mounted on said shaft and arranged to receive and rotate said reel, means to recede the cone with respect to the reel to present an ever decreasing form to the successive convolutions of the film, and means to insert the last convolution under the preceding convolutions of the film.

7. In a film winding mechanism, a reel comprisng two separable major parts, each of said parts having its own respective hub, the hub of the base part having a smaller diameter than that of the cap part for engagement therewith, and for engagement with a shaft, expanding tension arms secured to said base part and expansible by means of said cap part, a locking means for securing said base and cap parts together, a shaft mounted in a journal and arranged for rotatable and longitudinal movement therein, a furcated cone mounted on said shaft and arranged to receive and rotate said reel, means to recede the cone with respect to the reel to present an ever decreasing form to the successive convolutions of the film, means to insert the last convolution under the preceding convolutions of the film, and means to guide the film onto the form.

8. In a film winding mechanism, a reel comprising two separable major parts, each of said parts having its own respective hub, the hub of the base part having a smaller diameter than that of the cap part and engageable therewith, and arranged for engagement with a shaft, expanding tension arms secured to said base part and expansible by means of said cap part, a locking means for securing said base and cap parts together and operable by means of said shaft, said shaft being mounted in a journal and arranged for rotatable and longitudinal movement therein, a cone mounted on said shaft and arranged to receive said reel, means to maintain the base part of said reel perpendicular to said shaft, and means to spread apart said parts at the point of film reception and to maintain said parts against the film at another point, means to recede the cone with respect to the reel to present an ever decreasing form to the successive convolutions of the film, means to position the cap part on the cone to insert the last convolution under the preceding convolutions of the film, and a roller positioned to maintain the last convolution a distance from the form and to act as means to guide the film onto the form.

In testimony whereof I affix my signature.

RAYMOND B. CLARK.